(12) United States Patent
Ghosh

(10) Patent No.: US 9,100,274 B1
(45) Date of Patent: Aug. 4, 2015

(54) ENHANCED VIRTUAL ROUTER REDUNDANCY PROTOCOL HAVING INHERIT GROUPS AND ADVERTISEMENT COUNT

(75) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 159 days.

(21) Appl. No.: 13/585,614

(22) Filed: Aug. 14, 2012

(51) Int. Cl.
*H04L 12/701* (2013.01)
*H04L 12/713* (2013.01)
*H04L 12/931* (2013.01)
*H04L 12/741* (2013.01)

(52) U.S. Cl.
CPC .............. *H04L 45/00* (2013.01); *H04L 45/586* (2013.01); *H04L 49/70* (2013.01); *H04L 45/74* (2013.01)

(58) Field of Classification Search
CPC ....... H04L 45/28; H04L 45/586; H04L 45/00; H04L 45/22; H04L 69/40; H04L 41/0668; H04L 49/70; H04L 45/74
USPC .............................. 370/219, 254, 389, 395.52
See application file for complete search history.

(56) References Cited

U.S. PATENT DOCUMENTS

| | | | | |
|---|---|---|---|---|
| 7,036,051 | B1 * | 4/2006 | Fernandes | 714/55 |
| 7,318,179 | B1 * | 1/2008 | Fernandes | 714/55 |
| 2003/0037165 | A1 * | 2/2003 | Shinomiya | 709/238 |
| 2004/0008694 | A1 * | 1/2004 | Guo | 370/395.52 |
| 2008/0151882 | A1 * | 6/2008 | Sanjay et al. | 370/389 |
| 2010/0182926 | A1 * | 7/2010 | Kubota | 370/252 |
| 2011/0141881 | A1 * | 6/2011 | Joshi et al. | 370/219 |
| 2011/0164494 | A1 * | 7/2011 | Kalyanjeet | 370/219 |

OTHER PUBLICATIONS

S. Nadas, Virtual router redundancy protocol (VRRP) version 3 for IPv4 and IPv6, Mar. 10, 2010, pp. 1 of 40.*
NADAS, "Virtual Router Redundancy Protocol (VRRP) Version 3 for IPv4 and IPv6", Internet Engineering Task Force (IETF), RFC: 5798, dated Mar. 2010, 41 pgs.
"Understanding VRRP on EX Series Switches", Technical Documentation—Support—Juniper Networks, available at http://www.juniper.net/techpubs/en_US/junos12.1/topics/concept/vrrp-ex-series.html, accessed May 16, 2012, published Mar. 28, 2011, 2 pgs.

* cited by examiner

*Primary Examiner* — Kwang B Yao
*Assistant Examiner* — Syed M Bokhari
(74) *Attorney, Agent, or Firm* — Shumaker & Sieffert, P.A.

(57) ABSTRACT

A configurable advertisement count and skew timer in a virtual router can be used to improve the speed with which a backup virtual router assumes the role of master upon the master router's failure. Enhanced VRRP packets having a type other than one may be used to cause MAC address movement from a failed master router to a backup router assuming the role of master router without placing an undue load on other routers in the network, such as by dropping the enhanced VRRP packets having a type other than one without processing the packets in the control plane of a receiving virtual router.

7 Claims, 6 Drawing Sheets

| 0 | | | 3 |
|---|---|---|---|
| 0 | 1 | 0 | 0 |

Advertisement Count    Skew Timer

| 4 | | | 7 |
|---|---|---|---|
| 1 | 1 | 1 | 1 |

Type Field

FIG. 4

ENHANCED VIRTUAL ROUTER REDUNDANCY PROTOCOL HAVING INHERIT GROUPS AND ADVERTISEMENT COUNT

FIELD

The invention relates generally to computer network routers, and more specifically to election protocols for assigning routing responsibilities in a computer network.

BACKGROUND

Computer networks have become commonplace and taken many forms, from cellular data networks for smart phones to localized networks such as a Wi-Fi network and the familiar Ethernet connections commonly used to provide hard-wired connection to the Internet. Networks such as these enable users to share resources and data, such as to surf the World Wide Web for information, to send email, or to view a streaming movie.

Information is communicated over the Internet using packet switching technology, in which information is broken up into packets of data that are routed from a source to a destination, typically based on a destination Internet Protocol (IP) address. Routers and other machines in the network use routing protocols to ensure that data makes it from the source machine to the intended destination, which is then able to reassemble the packets to form the original information sent, such as an email, a movie, or a web page.

For example, a user wishing to conduct online banking may open a browser window, such as Internet Explorer or another suitable browser, and enter a Uniform Resource Locator (URL) for the bank's website. The URL is converted to a destination IP address using a domain name server, and the web page request is sent to the bank's servers via the Internet by sending the request through a series of routers which route the request using the destination IP address.

Each router in the network maintains a routing table or other data structure, which includes information regarding the available routes to various network destinations. Routing tables are in some examples static, but in other examples are dynamically updated as a result of a routing protocol discovering information about the network topology around the router. Routing tables often also include metrics such as the distance associated with various routes, such as the number of hops and amount of time needed to communicate with a remote system over a certain network path.

Because routing tables can become large and complex as the size of a network such as the Internet grows, some routers use a forwarding table, which contains forwarding information for only those routes chosen by a routing algorithm for forwarding packets in a network to perform the actual forwarding of data. In such a router, a control plane is often responsible for overseeing management of the router, such as by employing a routing algorithm to maintain a routing table and generate the forwarding table, while a forwarding plane uses the forwarding table to route data packets.

In some cases, many modern routers are not simply a single system with a single control plane and forwarding plane, but are virtual routers which are served by one or more physical routers. In a more detailed example, a virtual router redundancy protocol (VRRP) is often used to specify a router group including a master virtual router, and one or more backup virtual routers on a different physical router operable to take over the master virtual router's routing tasks should the master virtual router fail. However, conventional VRRP protocols do not scale well, and often suffer from lengthy convergence time, i.e., the time required to failover to an elected backup virtual router in the event a master virtual router fails. For example, in router environments such as where many groups of master routers and backup routers are used to provide routing functionality on a smaller number of physical routers, communication of state information throughout the router environment at failover, such as communication of the identity of a backup virtual router that is taking over for a failed master virtual router can become problematic. For example, the associated backup virtual routers consume a significant share of physical router resources and network bandwidth as they broadcast their new roles as master routers to other groups of routers, which may number in the hundreds or thousands.

SUMMARY

This document describes techniques for addressing convergence in virtual router failover by employing an enhanced virtual router redundancy protocol, enabling a reduction in the amount of communication between routers that is processed in the event of a failure. Moreover, the enhanced virtual router redundancy protocol described herein may provide other functions such as reducing the timeout period for monitoring master router advertisements and removing the skew introduced between backup routers to reduce the chances of both devices attempting to assume the role of master upon failure of the original master router.

In one example, the enhanced virtual router redundancy protocol and VRRP packets defined herein support a configurable advertisement count (i.e., heartbeat count) and a selectively-enabled skew timer for the VRRP protocol. This may improve the speed with which the backup virtual router assumes the role of master upon the master router's failure by reducing unnecessary delay or wait time before the backup virtual router assumes a master router role.

In another example, enhanced virtual router redundancy protocol utilizes VRRP packets having a certain type indicating that the VRRP packets relate to an "inherit" virtual router group in which one or more groups of virtual routers follow the state of a different group of virtual routers, referred to herein as an "active" virtual router group. As described herein, receiving peer routers may automatically discard VRRP packets of this new type, e.g., within a data plane or other receiving hardware interface, without processing the packets in a control plane of the receiving router. Nevertheless, forwarding the new type of VRRP packets within the network ensures proper MAC address movement and learning within the network. This type of VRRP packets may be useful, for example, when a backup router assumes the role of master router, thereby assuming a MAC address of the original master router, and may reduce any load placed on the control planes of peer routers in the network in processing any update VRRP packets.

The details of one or more examples of the invention are set forth in the accompanying drawings and the description below. Other features, objects, and advantages of the invention will be apparent from the description and drawings, and from the claims.

BRIEF DESCRIPTION OF THE FIGURES

FIG. 4 shows a more detailed illustration of a portion of the VRRP packet of FIG. 3, consistent with an example embodiment.

DETAILED DESCRIPTION

Figure 1:
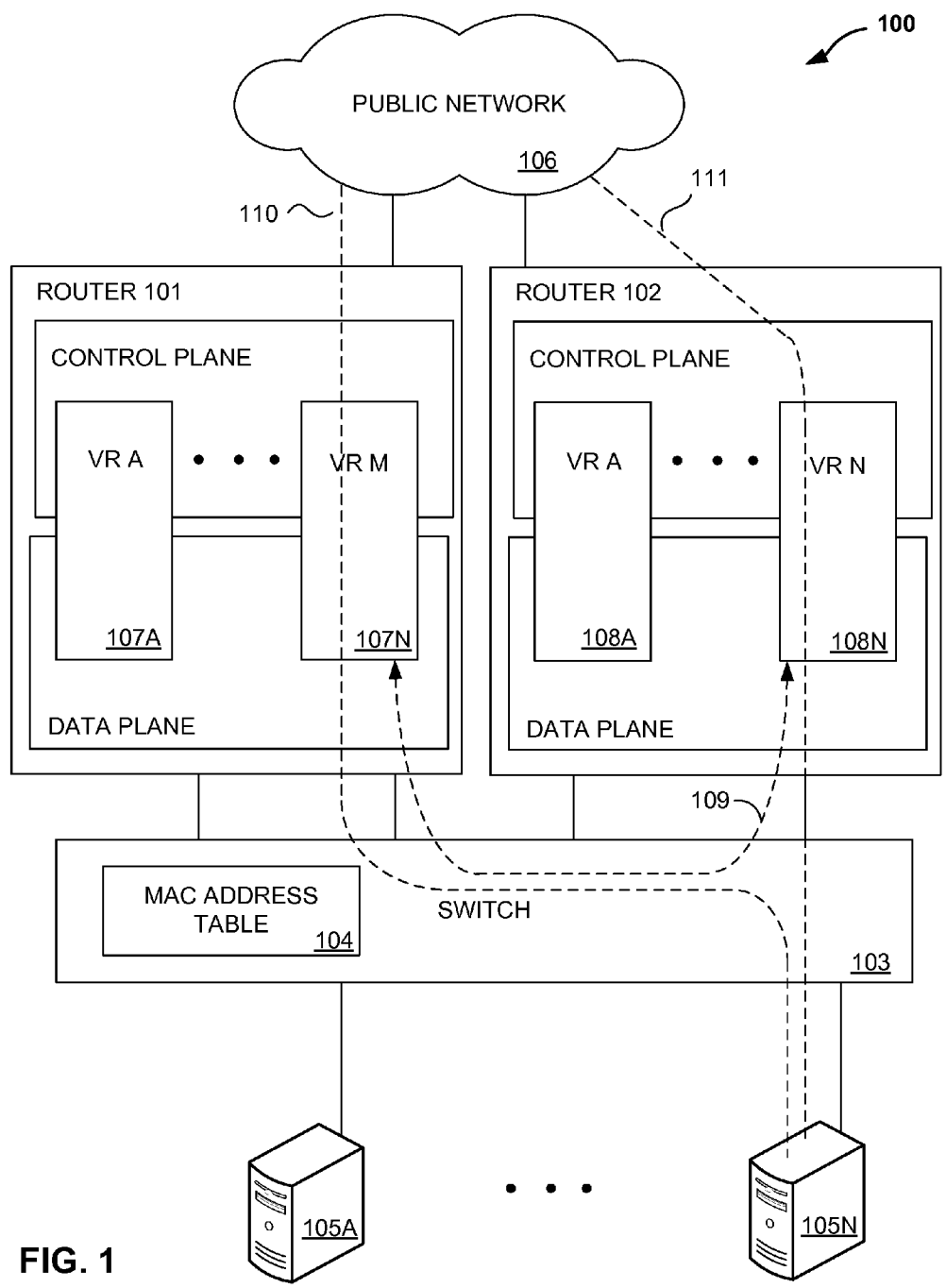
FIG. 1 is a block diagram network diagram in which virtual routers utilize an enhanced virtual router redundancy protocol (VRRP), consistent with some example embodiments.

FIG. 1 is a block diagram illustrating router network configuration, consistent with some example embodiments. In the example of FIG. 1, a first router 101 and a second router 102 operate within network 100, and are coupled by a layer 2 (L2) switch 103. Multiple routers are provided here for purposes such as redundancy, should one of the two routers fail, and for other purposes such as load balancing.

Switch 103 provides L2 switching operations for network 100. As shown, switch 103 is connected by network connections to both routers 101 and 102, and switches data from one device to another on a local network. More specifically, switch 103 receives messages from network devices such as client devices 105, and uses a MAC address table 104 to send the messages to desired destination devices by switching the incoming messages to the correct port coupled to the destination device. This is performed in a more detailed example by the switch learning the media access control address (MAC address) of the connected devices on the local network, and sending incoming data out the port associated with the MAC address of the destination node.

The routers 101 and 102 are further coupled to a public network 106, such as the Internet, and are operable to route data between client devices 105 and devices on the public network 106.

Routers 101 and 102 provide operating environments for one or more virtual routers, shown as 107A-107N and 108A-108N, which perform various routing and data forwarding functions as though each virtual router were a standalone router. For example, as shown, each of virtual routers 107 and 108 includes a virtual control plane and a virtual data plane, such as virtual routing and forwarding (VRF) components.

Further, each of virtual routers 107 and 108 may be associated with one another to form a group of redundant routers, each group having a master virtual router and one or more backup virtual routers, where the one or more backup virtual routers track the state of the associated master router in operation so that they are able to take over routing functions for the master virtual router of the group should the master virtual router fail. That is, the backup virtual routers typically do not perform routing functions, but track the state of the master routers using a virtual router communications protocol.

In one example, router 101 provides an operating environment for one or more master virtual routers 107, while router 102 provides an operating environment for one or more backup virtual routers 108 that take over in the event that router 101 fails. Similarly, router 102 may provide an operating environment for one or more master virtual routers 108 that are associated with one or more backup virtual routers 107 running on router 101, so that if router 102 fails the virtual routers running thereon are taken over by associated backup virtual routers running on router 101. In general, each virtual router group typically has a different network address (such as an IP address and media access control (MAC) address) that is owned by the master virtual router, which performs the routing functions for the virtual router group.

As shown in the example of FIG. 1, control planes of virtual routers 107 and 108 execute a virtual router communications protocol to establish communication sessions (e.g. communication session 109) between virtual routers for managing each group of redundant routers, including electing and assigning one master router and at least one backup router per router group. The virtual router communications protocol may, for example, provide certain functionality of the virtual router redundancy protocol (VRRP) as described in RFC 5798—Virtual Router Redundancy Protocol (VRRP) Version 3 for IPv4 and IPv6, Proposed Standard, dated March 2010, which is incorporated by reference.

As described herein, virtual routers 107 and 108 may utilize an enhanced VRRP protocol with respect to router-to-router communication sessions (e.g., communication session 109) to improve scalability and convergence time associated with groups of redundant virtual routers. For example, virtual routers 107 and 108 utilize router-to-router communication sessions to exchange messages to perform a variety of operations, such as establishment of a master router and at least one backup router to form a router group, and in a further example designation of one router group as an active group and other router groups as inherit groups that inherit their state from the master group. A master router for a group is determined in a more detailed example by assigning a priority to each of the routers in a group, and the router with the highest priority becomes the master. Priority can be used to assign a master router in a group, such as by removing a master router from its master role in a group during operation by assigning it a lower priority than the new intended master router, and waiting for inter-router communications to see that a different router now has the highest priority and should transition to the master role for the group.

In addition, virtual routers 107, 108 may be assigned into groups that are designated as "active" VRRP groups or "inherit" VRRP groups. For example, as referred to herein, an active VRRP group is a group of virtual routers that provides its state information to other router groups, referred to herein as "inherit" VRRP groups. As described herein, the enhanced VRRP protocol of virtual routers 107, 108 utilizes VRRP packets having a certain type indicating that the VRRP packets relate to an inherit virtual router group in which one or more groups of virtual routers follow the state of a different group of virtual routers, referred to herein as an active virtual router group. Receiving peer routers may be configured to automatically discard VRRP packets of this new type, e.g., within a data plane or other hardware interface of the receiving peer router, without processing the packets in a control plane of the receiving router. Nevertheless, forwarding the new type of VRRP packets within network 100 ensures proper MAC address movement and MAC learning be switch 103 and other devices within network 100. This type of VRRP packets may be useful, for example, when a backup virtual router assumes the role of master virtual router, thereby assuming a MAC address of the original master router, and may reduce any load placed on the control planes of peer routers in the network that would otherwise have to process any update VRRP packets issued by virtual routers within inherit VRRP groups. In this way, the virtual routers 107 and 108 in some embodiments execute an enhanced VRRP protocol including VRRP packets of a certain type (e.g., a type other than type 1, or "advertisement" type packets) that indicates that the VRRP packet originated from a router of an inherit VRRP group. In a further example, the VRRP packet types are type 15 or "inherit" type packets, such that the packets are sent to routers that are part of an inherit group but are not processed by the receiving routers.

For example, when a master virtual router such as one of routers 107 fails and a backup virtual router such as one of routers 108 takes its place, the new master router 108 sends its changed role to other routers in the network using VRRP packets. If the new master router 108 did not send such packets to inherit group routers, the inherit group routers would inherit their state from their associated active group routers, but various switches 103 coupled to inherit routers may not receive VRRP packets indicating triggering MAC address movement for the virtual router from the old master virtual router's port on switch 103 to the new master virtual router's port. In the example shown in FIG. 1, VRRP packets that have a type other than type 1, such as VRRP inherit packets of type 15, are therefore sent to inherit group virtual routers, triggering MAC address movement in network switch 103. The VRRP inherit packets can be distinguished from VRRP advertisement packets having a type 1, and can be dropped in the receiving routers without processing the packets, such as by dropping the packets in the data plane rather than forwarding them to the control plane for processing.

MAC address movement in a more detailed example occurs upon failure of a master router 107N, such as by failure of the physical router 101, causing network path 110 between a client device 105N and the public network 106 to fail. It is desired to use failed master router 107N's backup router 108N to reestablish a network path between client device 105N and the public network 106, as shown at 111. This is achieved by the backup router 108N, now acting as the new master router for the router group including routers 107N and 108N, sending a packet called a protocol data unit (PDU), such as a virtual router redundancy protocol (VRRP) packet, to other devices on the network. The VRRP packet includes the MAC address of the virtual router, which is now associated with the new master router 108N. This causes switch 103 to update the MAC address table 104 such that the port connecting switch 103 to virtual router 108N is now associated with the virtual router's MAC address, rather than the port connecting switch 103 to failed router 107(N). This process is known as MAC address movement, or MAC movement, and results in re-association of a MAC address previously associated with one switch port with another switch port.

Further, in a typical configuration, the master routers in each group may send regular advertisements over the VRRP communication sessions to other routers in the group and in other groups, such as once every 100 milliseconds, indicating its role as master router for the group and to provide a "heartbeat" or "keep-alive" signal indicating the master router remains operational. In the event of a hardware failure affecting the master router of one or more groups, other routers in the router group will detect the failure and take over responsibility as the master virtual router for the group. As described herein, in one example the enhanced VRRP protocol employed by the virtual routers 107, 108 of FIG. 1 includes an advertisement count field within certain VRRP packets, which may be used to change virtual router settings to facilitate more rapid transition from a failed master router to a new master router. More specifically, an Advertisement Count (AdCn) communicated between virtual routers 107,108 in some embodiments is used to specify a number of consecutive advertisements from a master router that are missed to determine that the master router has failed.

In another example, the enhanced VRRP protocol used by virtual routers 107, 108 supports VRRP packets in which a skew timer bit can be used to selectively enable or disable a skew timer feature of VRRP. Skew timers are used in some embodiments to provide some skew or randomness in the speed with which a backup virtual router will attempt to become a master virtual router based on the differing priority settings of the backup virtual routers, endeavoring to avoid having two backup virtual routers attempt to take the master role for the same failed master router at the same time. However, in environments where a master router is grouped with a single backup virtual router, adding skew only adds unnecessary delay to convergence of the new master virtual router. By supporting a selectively enabled skew timer, the enhanced VRRP system of FIG. 1 provides a mechanism for turning off the skew timer in configurations where it is not beneficial.

Figure 2:
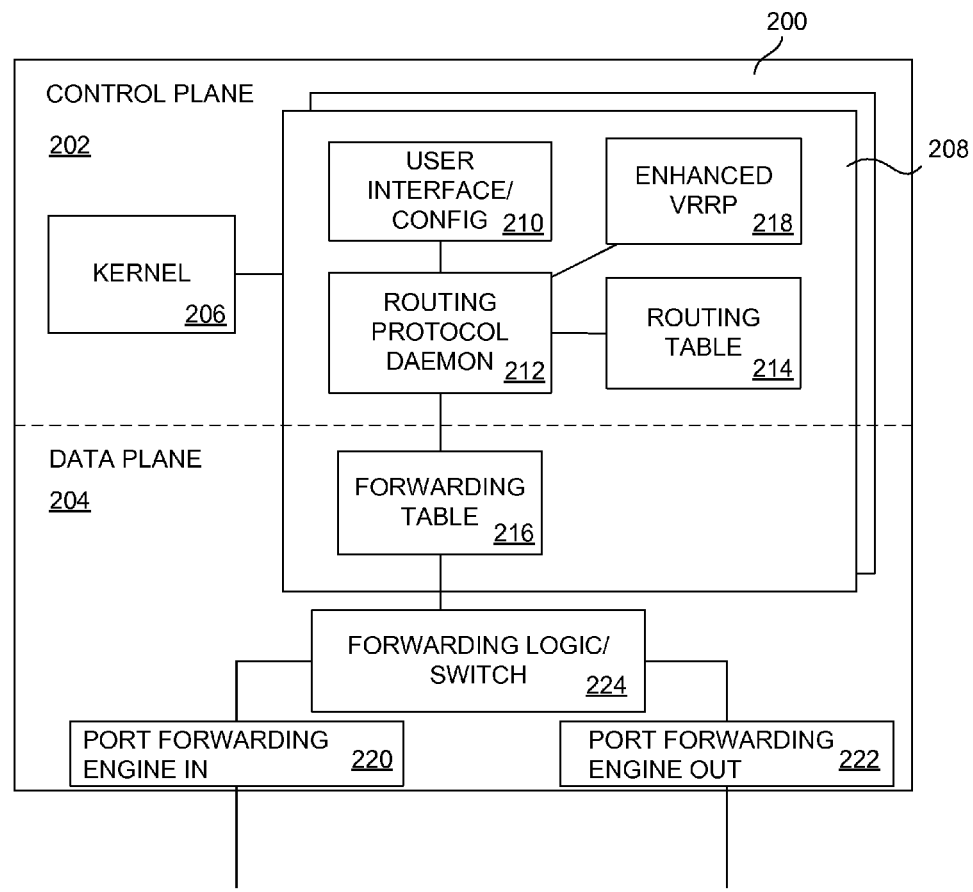
FIG. 2 is a block diagram of an example router supporting enhanced VRRP, consistent with some example embodiments.

FIG. 2 is a block diagram of an example router supporting enhanced VRRP, consistent with some example embodiments. Here, the physical router 200 includes two primary functional elements, the control plane 202 and the data plane 204, used to provide one or more virtual routers. The control plane 202 is operable to perform a variety of management functions for the virtual routers, including functions such as configuration, learning new routes through a routing protocol, and performing other such functions. The data plane 204 is operable to perform the actual routing of network traffic, receiving packets and forwarding them toward their destination address.

The control plane 202 in this example comprises a kernel of an operating system such as FreeBSD, Linux, or another operating system at 206, executing on a processor. The kernel supports other software elements including elements executing as part of one or more virtual routers 208, such as a user interface for configuration as shown at 210. The kernel also supports router management functions such as a routing protocol daemon 212 that is operable to perform tasks such as learning new routes using a routing algorithm, managing a routing table 214 by updating the routing table with newly learned routes, and providing a packet forwarding table 216 to the data plane 204 for use in forwarding packets. The virtual routers 208 also include an enhanced VRRP protocol 218, operating within the control plane of each virtual router.

The data plane 204 in this example includes packet forwarding or switching components that include a port forwarding engine input 220 and a port forwarding engine output 222, linked by a switch or forwarding logic 224. The forwarding logic is operable to receive packets and switch them to the correct output port based on information from the forwarding tables 216 of the virtual routers 208, which are derived from the routing tables 214 of virtual routers 208. The forwarding logic 224 is further operable to identify control packets that are not to be forwarded, such as configuration, router advertisements, route sharing, exception handling, other complex tasks that are to be routed to control plane for further processing. The forwarding logic in a further example routes VRRP packets to the enhanced VRRP protocol unit 224 if the received VRRP packets are of type 1, which is associated with advertisement type packets, and discards other VRRP packets.

The routing protocol daemon 212 shares routing table information with other routers, for example, by sending one or more packets out the correct port of the router's port forwarding engine output 222, through the forwarding logic 224 of the physical router 200. When the receiving router receives the packets containing the route information at its port forwarding engine input 218, they are passed on to the forwarding logic 224 and sent to the appropriate virtual router's routing protocol daemon 212 rather than being forwarded on to another system through the port forwarding engine's output 222. The routing protocol daemon then uses the updated route information to update the virtual router's routing table 214, and to build a new forwarding table 216 if needed to reflect the changes made to the routing table.

The virtual routers 208 execute an enhanced virtual router redundancy protocol (VRRP) 218 that is operable in accordance with the techniques described herein. For example, VRRP 218 may generate VRRP packets that have a type other than type 1, or advertisement type packets. In a further example, the VRRP packet types are type 15 or "inherit" type packets that are sent to routers that are part of an inherit group but are not processed by the receiving inherit group routers. In an alternate embodiment, the enhanced VRRP packets have any other type other than type 1, causing the packets to be dropped at the receiving router's forwarding logic 224 without passing the enhanced VRRP packet to the destination router's routing protocol daemon 212 or enhanced VRRP unit 218.

The enhanced VRRP protocol 218 employed by virtual routers 208 in another example supports an advertisement count field in enhanced VRRP packets, which may be used to change virtual router settings to facilitate more rapid transition from a failed master router to a new master router. More specifically, the Advertisement Count (AdCn) in some embodiments is used to specify a number of consecutive advertisements from a master router that are missed to determine that the master router has failed.

In another example, the enhanced VRRP protocol 218 supports VRRP packets with a skew timer bit, which can be used to turn off the skew timer feature of the enhanced VRRP unit 218. Skew timers are used in some embodiments to provide some skew or randomness in the speed with which a backup virtual router will attempt to become a master virtual router based on the differing priority settings of the backup virtual routers, endeavoring to avoid having two backup virtual routers attempt to take the master role for the same failed master router at the same time. In environments where a master router is grouped with a single backup virtual router, adding skew only adds unnecessary delay to convergence of the new master virtual router, so a configurable skew timer is employed in the enhanced VRRP unit 218, providing a mechanism for turning off the skew timer in configurations where it is not beneficial.

Figure 3:
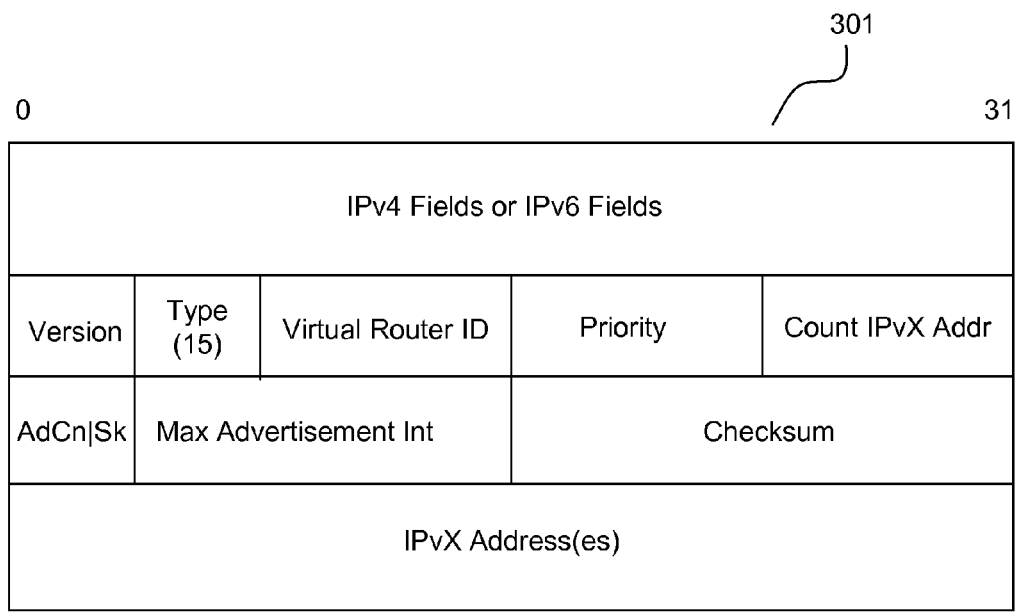
FIG. 3 is diagram illustrating an example enhanced VRRP packet formatted to reduce convergence time needed to move routing functions from a failed master router to backup router, consistent with an example embodiment.

FIG. 3 is diagram illustrating an example enhanced VRRP packet 301 formatted to reduce the time needed to move routing from a failed master router to backup router, consistent with an example embodiment. As explained above, VRRP packets are typically sent from one VRRP router to another, such as from virtual router 107N to virtual router 108N via communication session 109 as to advertise the sending router's status or to send configuration information to the receiving router. In this example, enhanced VRRP packet 301 of FIG. 3 includes a variety of data fields, including source and destination addresses in the IP fields section, VRRP version, Type, Priority, Maximum Advertisement Interval, and a variety of other such fields. Some of these fields may conform to the description of RFC 5798—Virtual Router Redundancy Protocol (VRRP) Version 3 for IPv4 and IPv6, Proposed Standard, dated March 2010, which is incorporated by reference.

In addition, in this example, enhanced VRRP packet 301 of FIG. 3 has a "Type" value that may be set to a value of one, indicating the VRRP packet is an advertisement, which is the only valid VRRP packet type recognized under the RFC5798 standard. The enhanced VRRP packet of FIG. 3 may also include a Type field that is not a one value, but is set to another value such as an inherit type 15 value, denoting that the VRRP packet is an inherit type advertisement that is used for MAC address movement but does not contain other data to be processed by a VRRP process of the receiving router or routers.

For example, because RFC 5798 requires VRRP packets having a type other than "1" to be discarded, VRRP packets having an inherit type of Type of 15, or in other embodiments another value other than a "1", may be automatically dropped in a receiving virtual router 208's data plane 204 without further processing the packet in the router's control plane 202, such as in the kernel 206, routing protocol daemon 205, or enhanced VRRP module 218 of FIG. 2. This may greatly reduce the processing burden of processing received VRRP packets from each new master router in a large number of devices including large numbers of inherit group backup routers in a large or complex router installation, reducing the processing load on a control plane of the receiving router while still facilitating rapid MAC address movement such that local traffic will be switched to the new master router.

The VRRP packet of FIG. 3 may also include two other data fields in various embodiments, including advertisement count (AdCn) and Skew (Sk), taking the place of the formerly reserved field provided in RFP 5798. These two fields may be used to change virtual router settings to facilitate more rapid transition from a failed master router to a new master router. More specifically, the Advertisement Count (AdCn) in some embodiments is used to specify an number of consecutive advertisements from a master router that are missed to determine that the master router has failed, and the skew timer is used to provide some skew or randomness in the speed with which a backup router will attempt to become a master router based on the differing priority settings of the backup routers, endeavoring to avoid having two backup routers attempt to take the master role for the same failed master router at the same time.

FIG. 4 shows a more detailed illustration of a portion of the VRRP packet of FIG. 3, consistent with an example embodiment. Here, three advertisement count bits fill the advertisement count or AdCn field shown in FIG. 3, and encode the number of missed master router VRRP advertisement packets that can be missed before an associated backup router begins taking over as the new master router. In a more detailed example, the three bits encode a value such as from 0 to 7, representing the number of advertisements that must be missed before the backup router begins taking over as the new master router. Using standard VRRP backup methods, advertisement VRRP packets are sent every 100 milliseconds, and a standard VRRP backup router takes over after missing three consecutive advertisement VRRP packets from its associated master router. The resulting 300 millisecond delay is in some configurations unnecessarily long, and providing a configurable or programmable advertisement count such as is shown in bits 0-2 of FIG. 4 enables configuration of backup routers to take over as master routers after missing a lesser number of advertisement VRRP packets, such as two advertisement packets, as shown by the encoded value of two. This provides an improvement of 100 milliseconds in the time taken for a backup router to assume a master role, significantly improving router switchover time in the event of a master router failure.

A single skew timer bit fills the Sk or skew field as shown in bit 4 of FIG. 4 and as SK in FIG. 3, and in this example is used to turn a skew timer on or off. The skew timer in a backup VRRP router uses the priority bits as shown in FIG. 3 to add a delay to backup router assumption of a master router role upon detecting a sufficient number of missed advertisements. A router with priority 255 is in this example always a master router, a router with 0 is intentionally giving up its role as master router (such as for service or maintenance), and routers with numbers between 0 and 255 have varying priorities or skew in taking over as master router.

For example, a master router having a backup router with a priority of 254 and a backup router with a priority of 100 might fail, causing the two backup routers to detect a lack of advertisement VRRP packets from the master router and take over as master router. Because only one master router is desired, the backup router priorities are used to calculate a delay before assuming the role of master router such that the router with priority 254 will wait an additional (((256-priority)*master advertisement interval)/256) milliseconds, or ((256-254)*1000 milliseconds)/256=7.8 milliseconds before taking over as master, while the backup router with priority 100 will wait an additional 600 milliseconds of skew time ((256-100)*1000 milliseconds)/256=600 milliseconds) before attempting to take over as master. The backup router with priority 254 will have taken over as master well before the router with priority 100, and will have sent a VRRP packet indicating this to the priority 100 router, avoiding both routers attempting to take over as master at the same time.

But, in environments where a master router has a single backup router, there is no need to implement this priority-based skew feature to avoid backup routers competing for the master router role in the event of a master router failure. The enhanced VRRP packet of FIG. 3 therefore includes a skew or Sk bit, as shown at bit 3 in FIG. 4, which can be set to zero to turn off the skew-based priority feature of VRRP backup routers in embodiments where it is not needed, saving a skew time of potentially near the master advertising interval (100 centiseconds default) for a backup router to take over for a failed master router.

Bits 4-7 of FIG. 4 are the VRRP packet type field (seen as "Type" in FIG. 3) and in this example encode the value 15 but in other examples can be any other value other than a value of one. As previously discussed, a one value indicates that the VRRP packet is a normal advertisement packet, while any other value is not valid and should be discarded by the receiving router. Such a discarded packet may not carry other VRRP information, such as changing the advertisement count or skew timer setting, but remains useful for MAC address movement because it still travels from the sending router to the receiving router without imposing a significant control plane processing load on the receiving router or routers.

Figure 5:
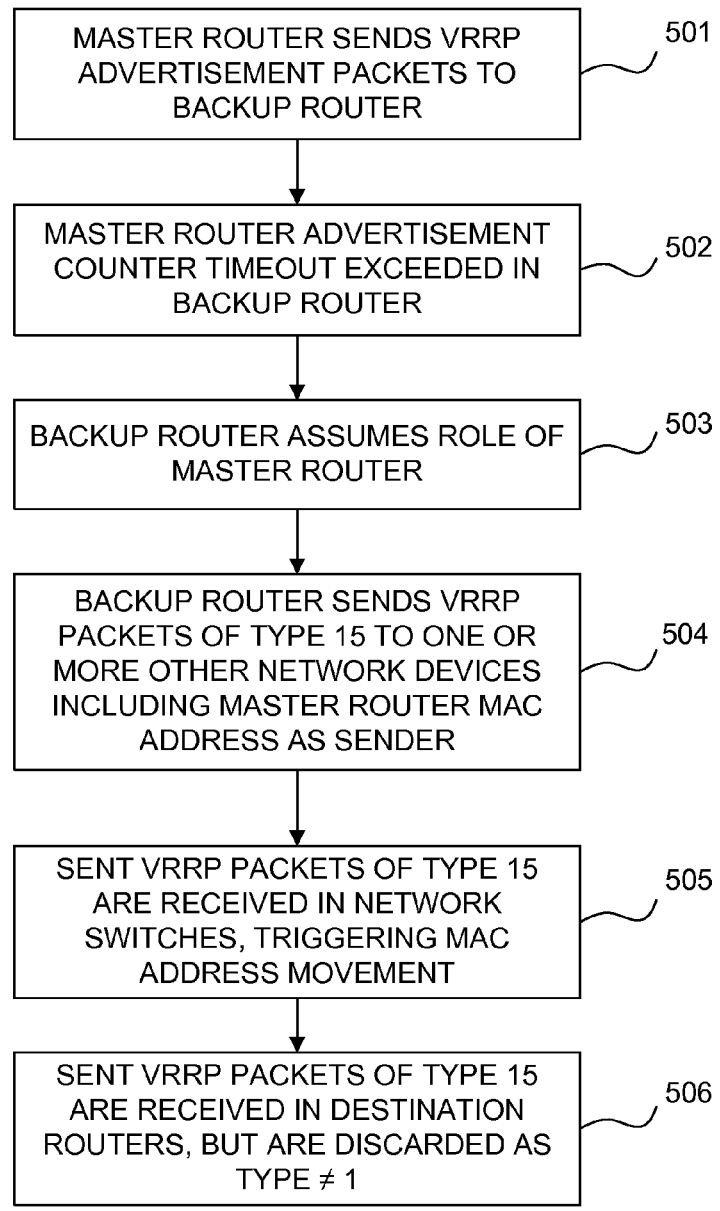
FIG. 5 is a flowchart of a method of using VRRP packets having a packet type to facilitate efficient MAC address movement, consistent with an example embodiment.

FIG. 5 is a flowchart of a method of using VRRP packets having a packet type other than one to facilitate efficient MAC address movement, consistent with an example embodiment. MAC address movement is performed in some examples to move the MAC address of a failed master router, such as virtual router 107N of FIG. 1, to a backup router assuming the role of master router, such as virtual router 108N of FIG. 1 so that the backup router assuming the role of master router receives network traffic directed to the failed master router's MAC address.

At 501, a functioning master virtual router in an active group sends an advertisement of its state periodically as a VRRP advertisement packet to other routers in the local network, such as every 100 milliseconds. At least one associated backup virtual router monitors the VRRP advertisement packets, and when a predetermined timeout period is exceeded, such as two or three consecutive missed advertisements, the backup router determines that the master router has failed at 502.

This causes the backup router to assume the role of master router at 503. The backup router not only performs the functions previously performed by the master router, but takes its place on the network by assuming the failed master router's MAC address so that it receives packets intended for the failed master router. To do this, the backup router sends VRRP packets of Type 15, or in other examples of any type other than a normal advertisement (type 1), to one or more other networked devices at 504. In a further example, the one or more other networked devices comprise inherit group virtual routers that receive their state information from active group routers.

The sent VRRP packets include the failed master router's MAC address as the sender's MAC address, causing switches such as switch 103 of FIG. 1 to receive the packets and relearn the switch port that should be associated with the MAC address. The switch therefore performs MAC address movement for the failed master router's MAC address from the failed master router's port to the port of the backup router that has assumed the role of master router's port at 505, changing traffic flow in the example of FIG. 1 from path 110 through the failed master router to path 111, through the backup router assuming the master role for the router group. The destination router receives the VRRP packet at 506, but recognizes the packet as being a VRRP packet having a type other than a normal advertisement package (Type 1), and so discards the packet. In a further example, the packet is discarded such as in the data plane 204 of FIG. 2 without passing the packet up to the control plane 202 for processing. This reduces the burden on the receiving router of packets used to trigger MAC address movement, as the receiving router may simply discard such enhanced VRRP packets without processing them in the control plane based on the VRRP packet's type.

Figure 6A:
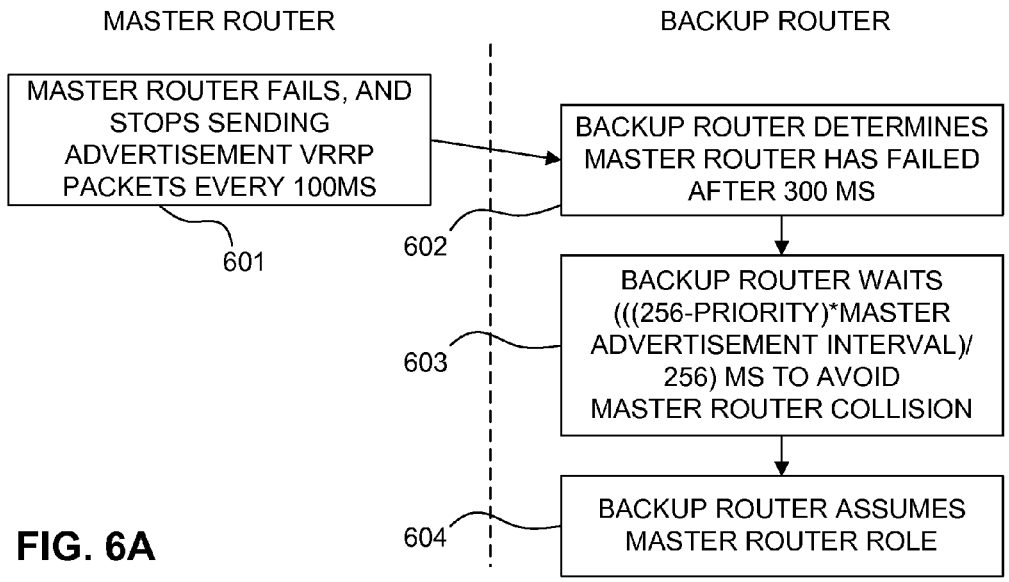
FIG. 6A is a flowchart of a method of using a backup VRRP router to take the place of a failed master router, consistent with an example embodiment.

FIG. 6A is a flowchart of a method of using a backup VRRP router to take the place of a failed master router. In a more detailed example, a master virtual router such as 107N of FIG. 1 fails, causing a backup virtual router such as 108N to assume the failed master virtual router's role. Referring to FIG. 6A, a master router that has at least one VRRP backup router fails at 601, such as through a hardware failure on the router hardware hosting the virtual router. This results in the master virtual router operation stopping operation, including stopping sending VRRP advertisement packets to other routers every 100 milliseconds. These VRRP advertisement packets are monitored by the backup router or routers, and absence of these packets can be used to indicate a problem such as failure of the master router.

At 602, the backup router or routers determine that the master router has failed after three consecutive VRRP advertisement packets from the master router are not received, which takes approximately 300 milliseconds for VRRP advertisement packets sent every 100 milliseconds. The backup router or routers then attempt to take over as master router, resuming normal operation for the virtual router.

To avoid two or more backup routers attempting to take the role of master at the same time, the backup routers have a skew timer enabled, and use the skew timer and the respective priority levels of the backup routers to add a variable delay to the 300 milliseconds already taken to determine that the master router has failed to begin advertising their role as the new master router, as shown at 603. The priority for a backup router varies in this example from 254 to one, with 254 being the highest priority, such that the added delay is (((256-priority)*master advertisement interval)/256) milliseconds. A router with priority 254 will wait 7.8 additional milliseconds before attempting to take the role of master router, while a backup router with priority 100 will wait 600 additional milliseconds before attempting to become the master router at 604. This difference in skew time between backup routers helps reduce the probability of two backup routers attempting to become the new master router at the same time, but does not guarantee that backup routers having similar priorities in large scale installations will not compete to become master under some conditions.

Figure 6B:
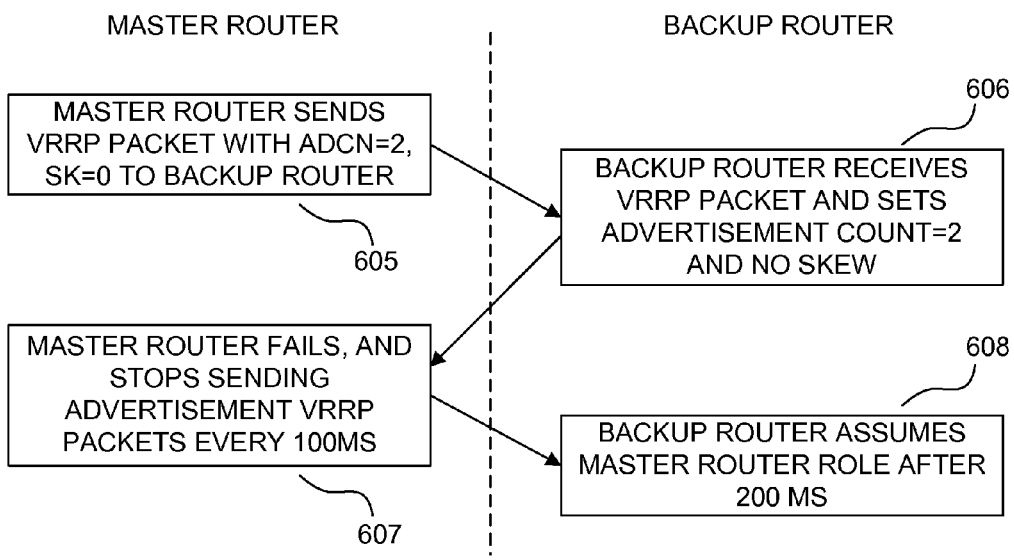
FIG. 6B is a flowchart of a method of using advertisement count and skew settings in a VRRP packet to provide for faster backup router transition to a master router, consistent with an example embodiment.

FIG. 6B is a flowchart of a method of using advertisement count and skew settings in an enhanced VRRP packet to provide for improved backup router transition to a master router, consistent with an example embodiment. Here, it has been determined that failure of a master router can be effectively identified by failure to receive only two consecutive VRRP advertisement packets from the master router, rather than the three missed packets used in the example of FIG. 6A. The master router, or in other examples another networked configuration system, sends a VRRP packet indicating and advertisement count (AdCn) of 2 to the backup router at 605, indicating that the backup router can determine that the master router has failed after failing to receive two consecutive VRRP advertisement packets from the master router.

In this example, there is a single backup router associated with the master router, which differs from the assumed two or more backup routers that may be associated with the master router of the example of FIG. 6A. Use of a single backup router enables the backup router to be configured such that the skew timer is turned off, and additional skew time based on the backup router's priority is not added as a delay before attempting to take the role as master router. Skew time based on priority is not needed here, as use of a single backup router ensures that no other backup router will compete to become the new master upon failure of the master router. The VRRP packet sent to the backup router at 605 therefore also contains a Sk=0 value indicating that the skew timer is to be turned off, resulting in the backup router attempting to take the role of master without an added skew timer delay.

The backup router receives this VRRP packet and sets the advertisement count to two and turns off the skew timer as dictated by the AdCn=2 and Sk=0 fields of the improved VRRP packet as shown in FIGS. 3 and 4. When the master router eventually fails and stops sending VRRP advertisement packets every 100 ms at 607, the backup router determines that the master router has failed after only two missed VRRP packets, and does not add a skew delay based on the backup router's priority, enabling the backup router to assume the role of master router as quickly as 200 milliseconds after failure of the master router at 608. This is significantly faster than the 300 millisecond delay for three consecutive missed VRRP advertisement packets plus 155 milliseconds in skew timer delay based on the backup router's priority of 100, for a total of 455 milliseconds.

Actual improvement in time observed using a reduced advertisement count and no skew timer as in the example of FIG. 6B will depend on the priority of the backup router, which in an alternate embodiment may be set to a priority of 254 in installations with only a single backup router for a master router. Delay in a backup router assuming the role of master router will also vary with the timing of a master router failure, such that a failure immediately after a VRRP advertisement packet has been sent will not result in a missed VRRP advertisement packet for approximately 100 ms, while a failure immediately before a VRRP advertisement packet is sent may be observed as a missed VRRP advertisement only a few milliseconds after failure.

In environments where virtual routers may not implement features such as a configurable advertisement count and skew timer, these bits will not be recognized and in a further example are desirably set to zero. Similarly, a VRRP router implementing a configurable advertisement count and skew timer will recognize that if these four bits are set to zero, the sending router does not implement these features and will default to an advertisement count of three and skew timer enabled, consistent with RFC 5798.

The virtual router examples presented here illustrate how a configurable advertisement count and skew timer in a virtual router can be used to improve the speed with which the backup virtual router assumes the role of master upon the master router's failure, and how VRRP packets having a type other than one may be used to cause MAC address movement to a backup router assuming the role of master router without placing an undue load on other routers in the network. Although such virtual routers are often executed on specialized hardware having components configured specifically to perform these functions, the user computer systems, virtual machines, web servers, switches, and other computing resources in the various examples presented here can be implemented in a variety of computerized systems.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, the examples described here may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

The example embodiments presented here illustrate how a configurable advertisement count and skew timer in a backup virtual router can be used to improve the speed with which the backup virtual router assumes the role of master upon the master router's failure, and how VRRP packets having a type other than one may be used to cause MAC address movement to a backup router assuming the role of master router without placing an undue load on other routers in the network. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments of the invention described herein. It is intended that this invention be limited only by the claims, and the full scope of equivalents thereof.

The invention claimed is:

1. A network device comprising: a control unit operable to provide a plurality of backup virtual routers for respective groups of redundant virtual routers, each of the groups of redundant routers having a respective master virtual routers executing on a second network device; and an enhanced virtual router redundancy protocol (VRRP) unit executing within each of the plurality of backup virtual routers, wherein at least a first one of the groups of redundant virtual routers is configured as an active VRRP group in which the backup virtual router tracks an operational state of the master virtual router for the active VRRP group by processing VRRP packets received from the respective master virtual router, wherein at least a second one of the groups of redundant virtual routers is configured as an inherit VRRP group in which the backup virtual router uses the operational state of the master virtual router of the active VRRP group as an operation state for the master virtual router of the inherit group, without processing VRRP packets from the master virtual router of the inherit VRRP group, and wherein, responsive to failure of the master virtual router of the active VRRP group, the backup virtual router of the inherit group sends a VRRP packet having a type other than type 1 to one or more other virtual routers via a switch, the VRRP packet comprising a source MAC address that is the media access control (MAC) address of the failed master virtual router.

2. The network device of claim 1, wherein the network device comprises a router.

3. The network device of claim 1,
wherein, responsive to failure of the master virtual router of the active VRRP group via one or more missed VRRP advertisement packets, the backup virtual router of the active VRRP group sends a VRRP packet of type 1 to take the place of the failed master virtual router of the active group of virtual routers and the backup virtual router of the inherit group sends a VRRP packet having a type other than type 1 to take the place of the master virtual router of the inherit group of virtual routers.

4. The network device of claim 3, wherein the type other than type 1 is type 15.

5. A method comprising:
executing a plurality of groups of redundant virtual routers, each of the groups of redundant routers having a respective master virtual routers and a respective backup virtual routers, wherein at least a first one of the groups of redundant virtual routers is configured as an active virtual router redundancy protocol (VRRP) group in which the backup virtual router tracks an operational state of the master virtual router for the active VRRP group by processing VRRP packets from the respective master virtual router, and wherein at least a second one of the groups of redundant virtual routers is configured as an inherit VRRP group in which the backup virtual router uses the operational state of the master virtual router of the active VRRP group as an operation state for the master virtual router of the inherit group without processing VRRP packets from the master virtual router of the inherit VRRP group; and
responsive to failure of the master virtual router of the active VRRP group via one or more missed VRRP advertisement packets, sending, with the backup virtual router, a VRRP packet of type 1 to take the place of the failed master virtual router of the active group of virtual routers and sending, with the backup virtual router of the inherit group, a VRRP packet having a type other than type 1 to take the place of the master virtual router of the inherit group of virtual routers.

6. The method of claim 5, wherein the type other than type 1 is type 15.

7. The method of claim 6, further comprising:
receiving, in a first one of the redundant virtual routers, the VRRP packet having a type of 15 from the backup virtual router taking the place of the failed master router; and
discarding the received VRRP packet having a type of 15 without sending the VRRP packet to a control plane of the first one of the redundant routers.

* * * * *